United States Patent [19]

Mori et al.

[11] Patent Number: 4,554,540
[45] Date of Patent: Nov. 19, 1985

[54] SIGNAL FORMAT DETECTION CIRCUIT FOR DIGITAL RADIO PAGING RECEIVER

[75] Inventors: Toshihiro Mori; Koichi Nagata, both of Tokyo, Japan

[73] Assignee: Nippon Electric Co., Ltd., Japan

[21] Appl. No.: 443,004

[22] Filed: Nov. 19, 1982

[30] Foreign Application Priority Data

Nov. 19, 1981 [JP] Japan .................... 56-185762

[51] Int. Cl.$^4$ .............. H04Q 7/00; H04B 1/16; G08B 29/00; H04L 7/00
[52] U.S. Cl. .................. 340/825.44; 375/116; 371/55
[58] Field of Search ............ 340/825.44; 375/106, 375/114, 116; 371/55, 57, 2; 455/226, 63

[56] References Cited

U.S. PATENT DOCUMENTS

| | | | |
|---|---|---|---|
| 3,436,730 | 4/1969 | Widel | 371/55 |
| 3,808,367 | 4/1974 | Wigner et al. | 375/114 |
| 4,001,693 | 1/1977 | Stackhouse et al. | 375/114 |
| 4,160,240 | 7/1979 | Partidilo | 340/825.44 |
| 4,392,135 | 7/1983 | Ohyagi | 340/825.44 |
| 4,412,301 | 10/1983 | Strubeck | 371/57 |
| 4,479,125 | 10/1984 | Mori | 340/825.44 |

FOREIGN PATENT DOCUMENTS 2072908A 10/1981 United Kingdom .

OTHER PUBLICATIONS

Post Office Code Standardization Advisory Group Codes, British Telecom of Britain, 1978; 1979 First Reprint, Jul. 1979, pp. 1-35.

Primary Examiner—Donald J. Yusko
Attorney, Agent, or Firm—Sughrue, Mion, Zinn, Macpeak, and Seas

[57] ABSTRACT

A signal detection circuit for a digital radio paging receiver is provided for successfully detecting a desired signal. A demodulated carrier wave, modulated with a code having n bits, is written into an n-stage shift register in response to a clock pulse of frequency $f_s$. The output stages of the shift register are scanned in response to a scan signal of frequency $nf_s$ in order to provide an output. The output is dependent on the coincidence of the shift register outputs with a predetermined code and is used to enable an address detector circuit which compares a received signal to the desired signal stored in a PROM.

8 Claims, 20 Drawing Figures

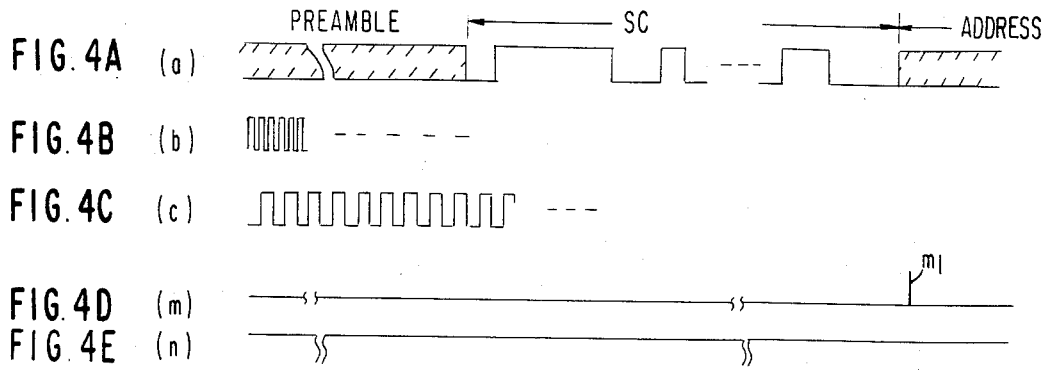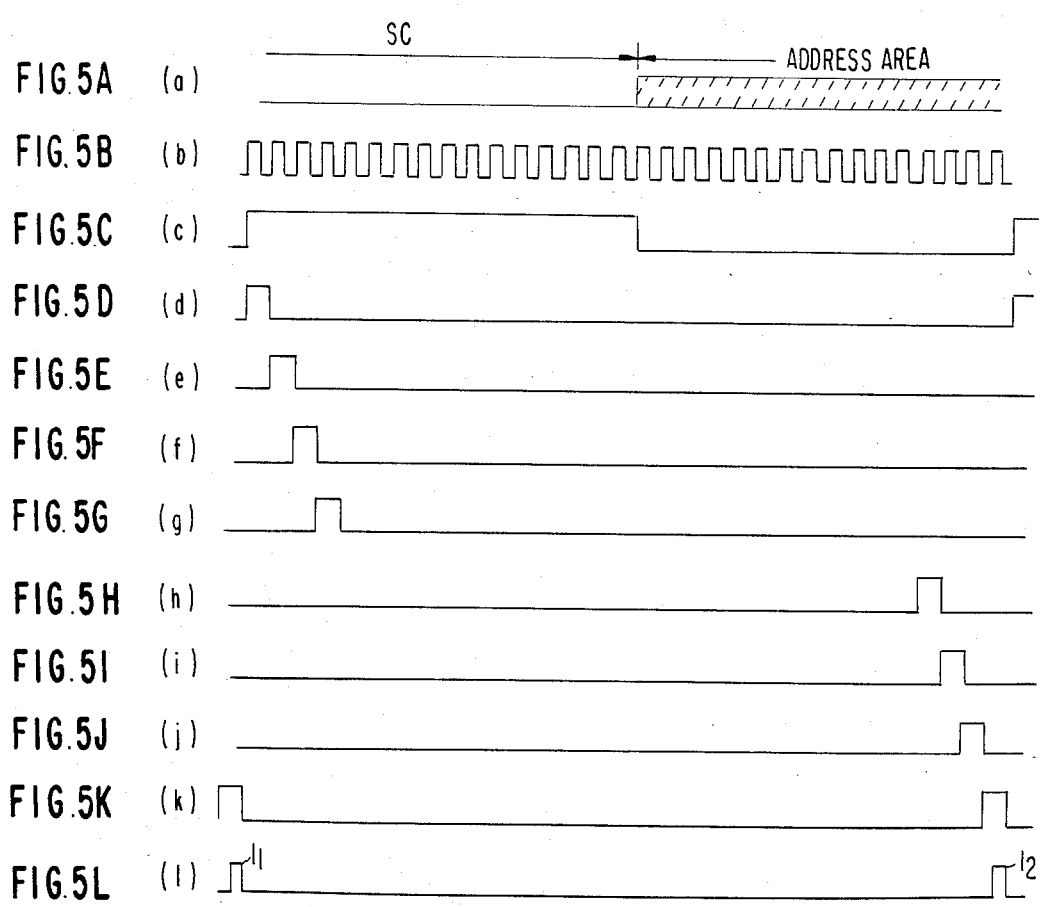

SIGNAL FORMAT DETECTION CIRCUIT FOR DIGITAL RADIO PAGING RECEIVER

BACKGROUND OF THE INVENTION

The present invention relates to a signal detection circuit suitable for a radio paging receiver and, more particularly, to a circuit for detecting digital calling signals for use in a radio paging system.

In a radio paging system, a transition is now under way from tone signal processing to digital signal processing to meet the ever increasing amount of information and number of subscribers. Signal formats heretofore proposed for digital signal processing may be typified by the format called POCSAG (Post Office Code Standardization Advisory Group) codes proposed by BRITISH TELECOM of Britain. The signal according to the POCSAG system includes a preamble code signal followed by a plurality of batches which respectively indicate call numbers. Each batch begins with an SC (synchronization codeword) signal adapted to achieve frame synchronization and includes an address codeword signal following the SC signal.

When a radio paging receiver detects a preamble code signal while operating in an intermittent reception mode, which is usually referred to as a battery saving function, the battery saving function is temporarily suspended. Then, the receiver is continuously supplied with power for a certain period of time (such as 1.5 seconds). As the receiver receives the subsequent SC signal, the battery saving function is entirely cancelled in order to detect an address codeword signal which will follow the SC signal. For details of the battery saving function, refer to the U.K. Patent Application published on Oct. 7, 1981 under Ser. No. 2,072,908 corresponding to Japanese patent application No. 55-39038, which was assigned to the same assignee as in this application.

As described, the SC signal is adapted for frame synchronization and complete suspension of the battery saving function. Many kinds of SC signals may be used to accommodate a larger number of addresses, as has been contemplated in the art concerned. Generally, an SC code signal is constituted by an error correcting code in order to increase the reliability of the communication system.

However, a circuit used for detecting the signal format including error correcting codes has various problems. For example, if the beginning or head end of the SC signal is unidentifiable, the SC signal cannot be correctly detected. Therefore, it is necessary to add a circuit for detecting the beginning of the SC signal, complicating the circuit structure as a whole.

SUMMARY OF THE INVENTION

It is an object of the present invention to provide a simple signal detection circuit which presents a solution to the problems discussed above and is capable of detecting an SC signal without detecting the beginning of the SC signal.

It is another object of the present invention to substantially increase the number of available channels of radio paging receivers by use of the above-mentioned signal detection circuit.

According to one aspect of the present invention, there is provided a signal detection circuit comprising: means for receiving and demodulating a carrier wave modulated with at least a code having n bits, n being an integer not less than 2; means for writing the demodulated output in an n-stage shift register where n is an integer not less than 2, in response to a clock pulse having a frequency $f_s$; means for generating the clock pulse; first means for sequentially scanning the n output stages of the shift register, in response to a scan signal of a frequency $nf_s$, to provide an output when the present outputs of said stages respectively do not coincide with bits of a predetermined code; and means for determining whether or not the predetermined code has been detected, in response to an output of the first means.

According to another aspect of the present invention, there is provided a signal detection circuit for a digital paging receiver, comprising: means for receiving and demodulating a carrier wave modulated with a calling signal which includes a synchronization codeword having n bits, n being an integer not less than 2; means for writing the demodulated output in an n-stage shift register in response to a clock pulse having a frequency $f_s$; means for generating the clock pulse; first means for sequentially scanning the n output stage of the shift register in response to a scan signal of a frequency $nf_s$, to provide an output depending on the coincidence of the n stages outputs with a synchronization codeword; and means for determining whether or not the synchronization codeword has been received, in response to the output of the first means.

BRIEF DESCRIPTION OF THE DRAWINGS

These and other objects, characteristic features and advantages of the present invention will be described in detail with reference to the accompanying drawings in which:

FIGS. 4A–4E and 5A–5L are timing charts demonstrating the operation of the receiver shown in FIG. 3.

DESCRIPTION OF THE PREFERRED EMBODIMENT

Figure 1:
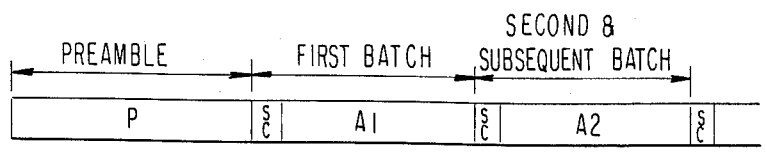
FIG. 1 is a diagram showing the format of POCSAG codes proposed by BRITISH TELECOM.

Referring to FIG. 1, a calling signal comprises a preamble signal P followed by a plurality of batches of codewords. The preamble signal P is made up of 576 bits in which logical "1" and "0" repeatedly occur. Each batch containing address codeword $A_1$ or $A_2$ begins with an SC signal. A carrier wave modulated with the calling signal is transmitted from a transmitter side in the conventional manner.

Figure 2:
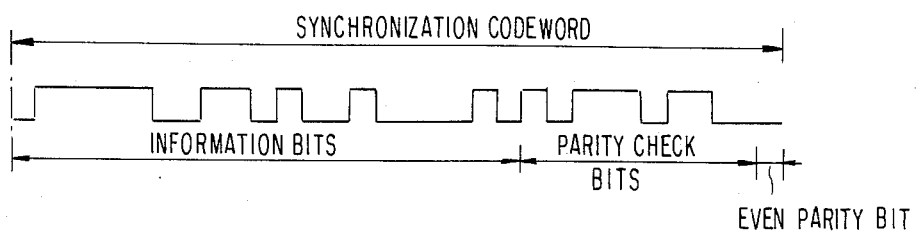
FIG. 2 is a diagram showing an example of SC signals contained in the format of FIG. 1 and applicable to a radio paging receiver of the present invention.

As shown in FIG. 2, each SC signal is constituted by an even parity bit in addition to a BCH (31, 21) code, which is a kind of cyclic block error correcting code. Thus, the SC signal comprises 21 information bits followed by 10 parity check bits which form the BCH (31, 21) code, and one even parity bit added to the end of the parity check bits.

It is known that BCH (31, 21) codes have a minimum Hamming distance of 5, so that they may correct up to 2 bit errors (W. Wesley Peterson, "ERROR CORRECTING CODE", 1961). This implies that when an object or desired signal to be received is fixed, a received input signal may be compared bit by bit with the desired signal to count up the non-coincidences so that, if the count is less than the maximum correctable error number of the codes, the received signal is regarded as equal to the desired signal. In short, two bit errors are allowed in the BCH (31, 21) code.

Figure 3:
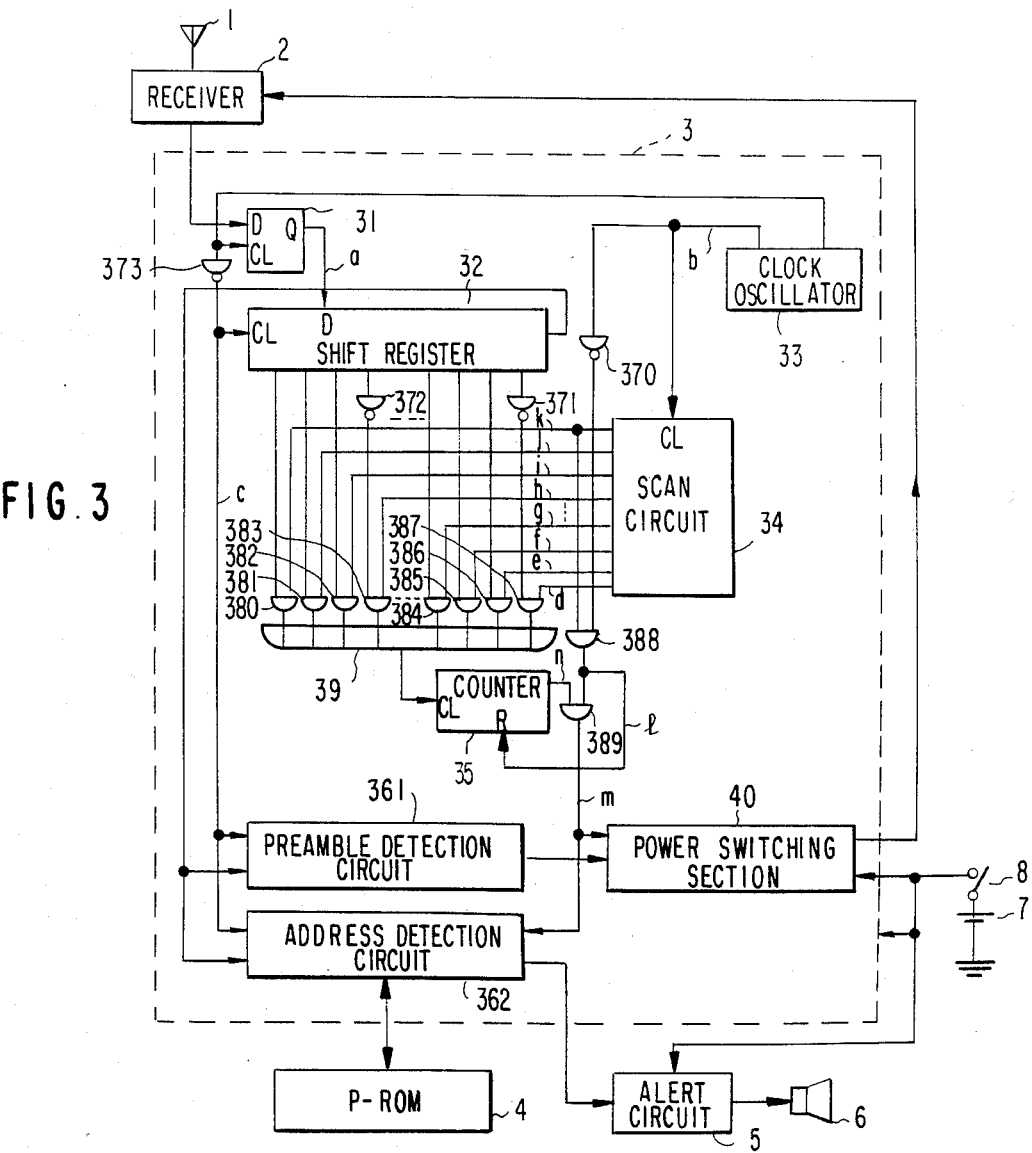
FIG. 3 is a schematic block diagram of a radio paging receiver embodying the present invention.

Referring to FIG. 3, a carrier wave modulated by the signal shown in FIG. 1 comes in through an antenna 1 and is coupled therefrom to a receiver section 2. The receiver section 2 demodulates the carrier wave and provides its demodulated output to a decoder section 3. At the decoder section 3, the demodulated signal is compared with information stored in a P-ROM (Programmable Read-Only-Memory) 4 which has stored an address codeword assigned to the receiver. If the demodulated signal is coincident with the stored address codeword, the decoder section 3 activates an alert circuit 5 which in turn causes a speaker 6 to sound.

The decoder section 3 and alert circuit 5 are commonly supplied with power from a battery 7 via a switch 8. The receiver section 2 is also supplied with power from the battery 7 but via a power switching section 40, which is included in the decoder 3 for the purpose of battery saving control. As regards the battery saving control, refer to the previously cited U.K. patent application.

The construction and operation of the decoder 3 will be described in detail with reference also to the timing charts of FIGS. 4A–4E and 5A–5L, in which a–n correspond to the points in FIG. 3 which are designated by the same reference characters. The decoder 3 includes a synchronization circuit 31, a 32-stage shift register 32, an oscillation circuit 33, a scan circuit 34, a counter 35, a preamble signal detection circuit 361, an address detection circuit 362, inverters 370–373, AND gates 380–389, an OR gate 39 and the power switching section 40.

While the receiver is receiving a signal under intermittent power supply from the battery 7, the received and demodulated signal a (FIG. 4A) is sequentially written in the 32-stage shift register 32 via the synchronization circuit 31 in response to clock pulses c (FIG. 4C) from the oscillator 33. At the same time, the output of the shift register 32 is coupled to the preamble signal detector 361 and the address detector 362, thereby allowing a preamble signal to be detected. The address detector 362, in this instance, remains inoperative die to the absence of the signal m. After the detection of the preamble signal has been confirmed, the power switching section 40 supplies the receiver section 2 with power continuously for a predetermined period of time so that the receiver section 2 may receive the following SC signal adapted to set up frame synchronization.

The respective stages of the shift register 32 are connected to the AND gates 380–387 either directly or through inverters 371 and 372, so that the outputs of all the stages become (logical) "L" level upon entry of a desired SC signal into the shift register 32. The other input terminal of each AND gate 380–387 is connected with the scan circuit 34. The scan circuit 34 sequentially scans the AND gates 380–387 in response to clock pulses b (FIG. 4B) having a frequency which is 32 times the frequency $f_s$ of the clock pulses c (FIG. 4C), thereby sequentially directing the contents of the respective stages of the shift register to the OR gate 39. The output of the OR gate 39 is connected to the clock input of the counter 35 and, accordingly, the counter 35 is incremented by "1" through the OR gate 39 every time an "H" level appears at the output of any one of the AND gates 380–387.

As already mentioned, the circuitry is constructed such that the outputs of all the AND gates 380–387 become "L" level when the received signal written in the shift register 32 coincides with the desired signal, i.e., the SC signal in this instance. Hence, under the normal electric field level, the content of the counter 35 is "0" when the SC signal arrives. Even if the electric field of the receiver section 2 fluctuates to incur an error in one or two bits of the SC signal, the received signal is regarded as the SC signal because the SC signal is the BCH (31, 21) code which is allowed two bit errors, as mentioned earlier.

BCH (31, 21) codes are capable of correcting up to 2 bit errors for a minimum Hamming distance of 5. It follows that the received signal can be regarded as equal to the SC signal even though the counter 35 may be incremented to "2" at the maximum during the interval between two successive times of writing in the shift register 32. This equivalently realizes correction of up to two errors; correction of one error if the count is "1".

The output n of the counter 35 shown in FIG. 4E normally remains at an "H" level. In the case of a circuit equivalent to a one-error correction circuit, the counter output becomes an "L" level when at least two errors have been counted. In the case of a circuit equivalent to a two-error correction circuit, the counter output becomes an "L" level when at least three errors have been counted.

The scan circuit 34 is driven by clock pulses b (FIG. 5B) whose frequency is 32 times the frequency $f_s$ of the shift register write pulses c. The scan outputs d–k (FIGS. 5D–5K) of the scan circuit 34 sequentially drive the AND gates 380–387 to couple the outputs of the respective stages of the shift register 32 to the OR gate 39 either directly or through the inverters 371 and 372, thereby counting the counter 35. The correctable error number is predetermined to be "2" in this embodiment and, accordingly, the counter output n (FIG. 4E) remains "H" level though the content of the received signal may differ from the desired signal by up to two bits.

The AND gate 388 performs the logical AND between the 32nd scan output k (FIG. 5K) and the inverted version of the clock pulses b, providing an output l (FIG. 5L) to the AND gate 389. Then, the AND gate 389 reads the output n (FIG. 4E) out of the counter 35 and produces a detection signal m (FIG. 4D). At the same time, the counter 35 is reset to determine whether the new received signal stored in the shift register 32 is the SC signal in the manner described.

Thus, the desired signal can be detected even if the beginning of a codeword of a received signal is unidentifiable, by checking all of the 32 bits every time the data stored in the shift register 32 is altered. With the illustrated circuitry, two bits errors are allowed.

When the detection of the SC signal has been confirmed and the frame synchronization set up, the signal m (FIG. 4D) is supplied from the AND gate 389 to the power switching section 40 and the address detection circuit 362. In response to the signal m, the power switching section 40 continuously supplies power to the receiver section 2 to enable it to receive an address signal which follows the SC signal. The address detection circuit 362, in response to the signal m, starts comparing the received signal with the data stored in the P-ROM 4 which represents the address code-word assigned to the receiver. If the received signal is coincident with the stored data, the address detection circuit 362 drives the alert circuit 5 to inform a person holding the receiver of the call through the speaker 6.

The inverters 371 and 372 have been shown and described as being directly connected with the outputs of the different stages of the shift register 32 so that the outputs become an "L" level while the desired SC signal is stored in the shift register. If desired, the inverters can be connected with the outputs of the AND gates 380–387 without affecting the signal detecting function described hereinabove.

The oscillator 33 may be constituted by an astable multivibrator using a transistor or a CR oscillation circuit. Use may be made of a μFD4013 (manufactured by NEC) as a D-type flip-flop 31, μPD4017 (manufactured by NEC) as the counter 35, and a diode matrix or a transistor matrix (μPB-487R manufactured by NEC) as the P-ROM 4.

In summary, the present invention is successful in detecting a desired signal even if the beginning or head end of the received signal is unknown, because all the bits of the received signal written in a shift register are compared with the desired signal during the interval between two successive times of writing received signals in the shift register. This can be accomplished with negligible additional circuit and, therefore, with quite a simple circuitry arrangement.

Moreover, the present signal detection circuit allows the desired signal of a BCH code to have a predetermined number of errors which are less than the maximum correctable error number of the BCH code.

Additionally, the present invention promotes a practical increase in the number of available channels because it permits different calling codes assigned to different SC signals.

What is claimed is:

1. A signal detection circuit for a digital radio paging receiver, including means for receiving and demodulating a carrier wave modulated with a calling signal which includes a synchronization codeword having n bits, n being an integer not less than 2; register means having m stages for storing the demodulated output in response to clock pulses having a frequency $f_s$, m being an integer not less than 2; means for generating said clock pulses; combination circuit means, including at least one inverter circuit and at least one direct connection which are respectively coupled to the outputs of said register means such that outputs of said combination circuit means become a predetermined logical level when said register means stores said synchronization codeword;

scanning means for sequentially scanning said outputs of said combination circuit means in response to a scan signal of a frequency $kf_s$, k being equal to or greater than n; and means for determining whether said synchronization code word has been received, in response to output of said scanning means.

2. A signal detection circuit as claimed in claim 1, wherein said scanning means includes a circuit for generating said scan signal in response to said clock pulses; m AND gates supplied with respective outputs of said combination circuit means and with said scan signal; and an OR gate supplied with outputs from said m AND gates, whereby the output of said OR gate provides the output of said scanning means.

3. A signal detection circuit as claimed in claim 2, in which the determining means comprises a counter for counting the outputs of said OR gate to produce a determination signal at a predetermined count; and gate means for reading out the counter output as an output of said determining means.

4. A signal detection circuit as claimed in claim 1, in which said calling signal further includes a preamble code signal and address codewords, and said signal detection circuit further comprises battery saving means; means for temporarily ceasing the operation of said battery saving means upon detection of said preamble signal out of said demodulated output; means responsive to the output of said determining means for continuously suspending the operation of said battery saving means; means for detecting out of said demodulated output the address code word assigned to said receiver; and means responsive to the output of said detecting means, for generating an alert signal.

5. A signal detection circuit including means for receiving and demodulating a carrier wave modulated with at least a code having n bits, n being an integer not less than 2;

register means having m stages for storing the demodulated output in response to clock pulses having a frequency $f_s$, m being an integer not less than 2;

means for generating said clock pulses;

combination circuit means, including at least one inverter circuit and at least one direct connection which are respectively coupled to the outputs of said register means so that outputs of said combination circuit means become a predetermined logical level when said register means stores a predetermined code;

scanning means for sequentially scanning said outputs of said combination circuit means in response to a scan signal of a frequency $kf_s$, k being equal to or greater than n; and means for determining whether said predetermined code has been detected, in response to output of said scanning means.

6. A signal detection circuit as claimed in claim 5, wherein said scanning means comprises a circuit for generating said scan signal in response to said clock pulses, m AND gates supplied with the respective outputs of said combined circuit means and with said scan signal, and an OR gate supplied with outputs of said m AND gates, whereby the output of said OR gate provides the output of said scanning means.

7. A signal detection circuit as claimed in claim 6, in which the determining means comprises a counter for counting the outputs of said OR gate to produce a determination signal at a predetermined count; and gate means for reading out the counter output as an output of said determining means.

8. a signal detection circuit as claimed in claim 5, wherein both m and k are equal to n.

* * * * *